June 1, 1954  A. H. V. STEELE  2,679,920
SELECTIVE TRANSPORT MECHANISM
Filed June 28, 1950  2 Sheets-Sheet 1

Inventor
Arthur Herman Vivian
Steele
By [signature]

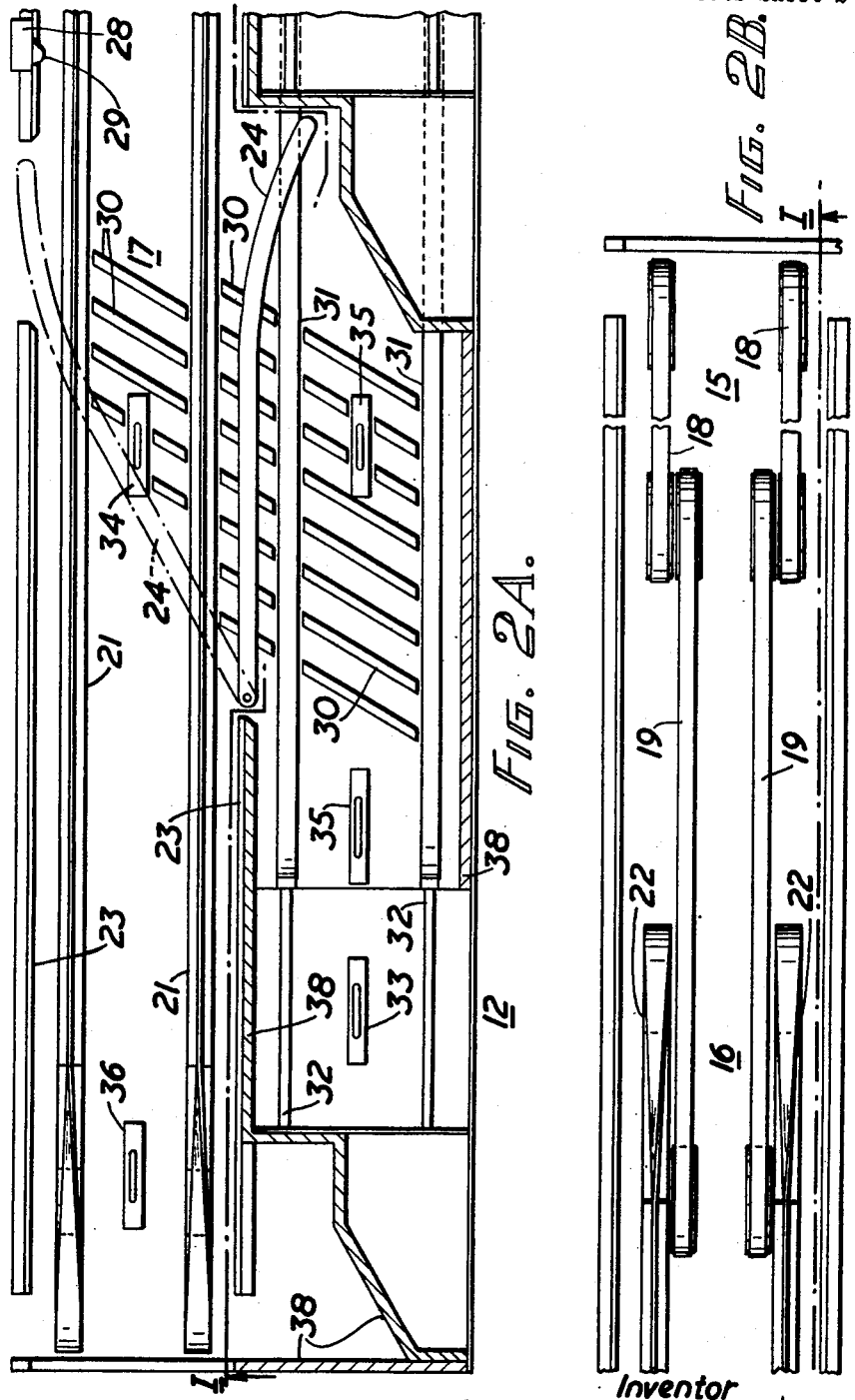

Patented June 1, 1954

2,679,920

UNITED STATES PATENT OFFICE 2,679,920

SELECTIVE TRANSPORT MECHANISM

Arthur H. V. Steele, Isleworth, England, assignor to J. Lyons & Company Limited, London, England, a British company Application June 28, 1950, Serial No. 170,741

Claims priority, application Great Britain June 29, 1949

6 Claims. (Cl. 198—38)

This invention relates to selective transport mechanism.

In certain industries, a variable selection of goods has to be collected and then delivered. The best example is that of the catering industry wherein in a restaurant a waiter or waitress takes an order consisting of various items from the customer at the table and then goes to the kitchen or store and collects the various items and brings them back to the customer.

One object of the present invention is to provide mechanism by means of which the waiter or waitress can be relieved entirely of the journey to the kitchen or store and according to one aspect of the invention there is provided a transport mechanism for conveying ordered goods from a kitchen to any preselected one of a number of waiter or waitress serving positions in a restaurant, comprising a conveyor adapted to carry the goods in trays past said positions, said trays having identification means characteristic of the positions for which they are intended, and means selectively operated in response to said identification means for removing a tray at the position corresponding to its identification means.

Put more generally the invention provides a transport mechanism for the conveyance of goods from a despatching station to any one of a plurality of receiving stations, comprising conveyor means adapted to convey the goods past said receiving stations, detector means adjacent each receiving station for detecting goods identified for delivery to that receiving station, and deflector means for deflecting goods so identified from said conveyor means into said receiving station.

Thus, in the example of a restaurant one method of operation is that an order identifying the various articles required is delivered by the waiter or waitress to a conveyor system by means of which the order is conveyed to the kitchen. The articles ordered are then arranged by the kitchen staff in a tray or carrier and by means of a conveyor mechanism the charged tray or carrier is conveyed back into the restaurant and delivered from the conveyor at a precise location assigned to the particular waiter or waitress who sent the order forward. Thus, all that is required of each waiter or waitress is that he or she sends each separate order by the conveyor system and awaits the arrival of the tray or carrier which contains the fulfilled order at the particular destination assigned to him or her at a receiving station in the restaurant.

One arrangement of a transport mechanism according to the invention and designed for use in a restaurant will now be described in greater detail, by way of example only.

The description will be made with reference to the accompanying diagrammatic drawings in which:

Figure 2 is a plan view along the line II—II in Figure 1.

Figure 3:
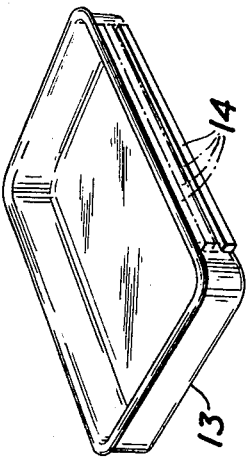
Figure 3 is a perspective view of a tray suitable for conveying ordered goods from the kitchen.

Referring now to the drawings, it will be seen that the system comprises three separate conveyors mounted one above the other the uppermost or "order" conveyor 10 comprises a pair of parallel endless belts 11 (only one of which is visible in Figure 1) which carry the written orders from the waiter's or waitress's serving positions, one of which is indicated generally in Figure 2 by the reference numeral 12 to the kitchen (not shown). Conveniently the trays or carriers which are used for carrying the ordered items from the kitchen to the serving positions are also used for carrying the written orders to the kitchen. What happens precisely to the order in the kitchen is no part of the invention. It may be dealt with in various ways but probably it will be received by a dispatching clerk who will collect or arrange for the collection of the various items which will, of course, usually differ in respect of the particular items required. Having collected the various items they are arranged on the tray or carrier 13, one of which is shown in Figure 3. In order to provide for the selective delivery of these trays or carriers 13 at their appropriate serving positions each of the trays 13 is provided with one or more strips 14 of wood or other suitable material along one side. The position and number of the strips 14 provides identification means characteristic of one of the serving positions.

The middle or "food" conveyor by which the loaded trays 13 are returned from the kitchen to the serving positions comprises a low speed conveyor 15, an accelerating unit 16 and a high speed conveyor 17. The purpose of this arrangement is to enable the trays to travel at a reasonably fast speed during the main part of the journey but to avoid the spilling of liquids by placing the trays on the slow moving conveyor 15 in the kitchen and providing the accelerating unit for bringing them up to the speed of the high speed conveyor 17.

By way of example it may be stated that a suitable speed for the low speed conveyor 15 is 25 feet-per-minute and for the high speed conveyor 17 is 160 feet-per-minute.

The low speed conveyor 15 comprises a pair of parallel endless belts 18, one end of which overlaps the accelerating unit 16 which also comprises a pair of parallel endless belts 19. The wheels 20 of the accelerating unit 16 are driven through a mechanism (not shown) which will periodically raise the speed of the belts 19 from that of the conveyor 15 to that of the conveyor 17. One suitable mechanism for this purpose is that described in British patent application No. 124,456/50, the shaft on which the eccentrically mounted driving wheel is mounted being driven from the low speed conveyor 15. A gate (not shown) is provided at the end of the conveyor 15, which is controlled from the accelerating unit 16 so as to admit a single tray 13 onto the belts 19 at the commencement of each accelerating cycle, the gate being raised or moved to one side for this purpose. The cycle is of course arranged so that the maximum speed is attained as the tray reaches the conveyor 17.

The high speed conveyor 17 likewise consists of a pair of parallel endless belts 20 which during the majority of their forward path are vertically disposed in hardwood or metal tracks 21, the upper edge of the belts 20 projecting only slightly above the upper surface of the tracks 21. The pulleys 22 on which the belts 20 are supported at one end adjacent the end of the accelerating unit 16, are positioned so that the belts 20 when horizontal lie below the level of the belts 19, but as they twist into a vertical plane so the upper edge of the belts 20 rises to the level of the belts 19.

Hardwood or metal guide strips 23 are mounted on either side of the middle conveyor for guiding trays 13 during their passage thereon.

Each serving position is similar to the position 12 shown in Figure 2, and is provided with a deflecting arm 24 (see also Figure 1) which normally lies in the position shown in Figure 2. However, if air is admitted to the pneumatic cylinder 25, the arm 24 is swung out to the position shown in broken lines in Figure 2. This is caused by the outward movement of the piston in the cylinder 25 consequent upon the admission of air turning the arm 26 on the axle 27 which carries the deflecting arm 24. The admission of air to the cylinder 25 occurs when an electric track switch 28 associated with the serving position is operated by a passing tray 13. The switches 28 have one or more projecting fingers 29. The position and number of these fingers 29 is such that for each serving position they correspond to the position and number of the strips 14 on the trays 13 associated with that serving position, so that the finger or fingers 29 is or are only depressed by trays associated with that particular serving position. Such depression is arranged to complete the operating circuit of a solenoid controlling moving of a pneumatic piston valve (not shown) which is thereby moved to admit air to the cylinder 25.

Thus it will be seen that passage of trays 13 past the track switch 28 associated with the serving position for which they are destined causes the deflecting arm 24 to swing out across the path of the oncoming tray which is thereby deflected across the inclined skid-bars 30 onto a low-speed conveyor 31. This conveyor 31 is common to all the serving positions and delivers the tray onto skid bars 32 where it depresses an operating arm of an arrival switch 33 which completes the circuit of a visual indicator (not shown) for indicating to the waiter or waitress that a tray has arrived. A switch 34 is provided in the track adjacent the deflecting arm 24 and is operated by passing trays. Operation of this switch 34 when the track switch 28 has previously been operated interrupts the operating circuit of the solenoid controlling the pneumatic piston valve and exhausts air from the cylinder 25 so that the deflecting arm 24 swings back to its normal position.

It may be that the waiter or waitress is unable to clear a tray as soon as it arrives on the skid-bars 32, and that before the tray is cleared two further trays are deflected onto the conveyor 31 at this serving position. The length of the conveyor available at any one serving position in this particular arrangement is such that there is no room to receive further trays. It is therefore necessary to prevent further operation of the deflecting arm 24 at this serving position as long as there are already three trays waiting to be cleared. For this purpose two further electric switches 35 are provided in the track of the conveyor 31 at each serving position, arranged so that operating arms of both these switches 35 are depressed by second and third trays not yet cleared. These switches 35 are connected so that when operated they prevent energising of the operating circuit of the piston valve solenoid. As a result additional trays passing their associated track switch 28 will not operate the deflecting arm 24 until the removal of one or more of the trays already at the serving position. Such trays will pass onto the end of the conveyor 17 where the first tray to arrive operates a switch 36 which in turn operates an indicator (not shown) to indicate to a supervisor that a tray has failed to enter its destined serving position. This indicator will also be operated by a tray which arrives at the end of the conveyor 17 due to any failure of operation of the deflection system. The tray can then be removed through a hinged door provided for this purpose.

Figure 1:
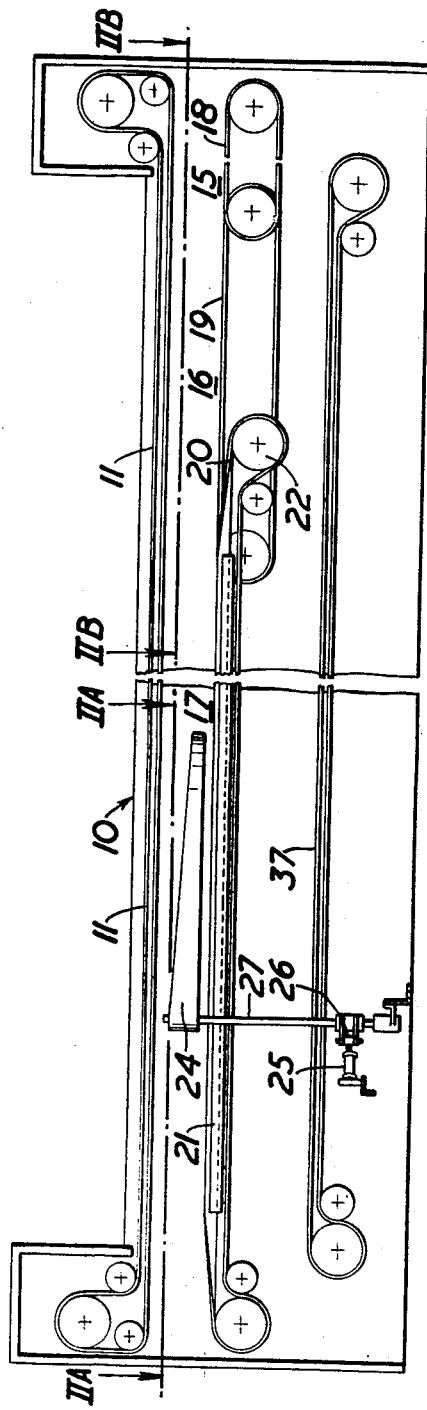
Figure 1 is a side elevation of the mechanism along the line I—I in Figure 2, only one serving position being shown for ease of understanding the drawing, whilst.

For the return of dirty crockery and the like on suitable carriers to a washing-up station (not shown) a belt conveyor 37 the "dirties" conveyor is provided below the delivery conveyor (see Figure 1). Preferably the major part of the transport mechanism within the restaurant is enclosed within a suitable structure having walls 38 (see Figure 2), apertures being provided for the withdrawal of a tray delivered onto the skid-bars 32, and for placing returned trays and dirty crockery carriers on the conveyors 10 and 37 respectively. It is desirable to prevent collision with trays or carriers already on the conveyors 10 and 37, the approach of which cannot be seen owing to the structure, by trays or carriers inserted through apertures other than the one nearest the end of the delivery conveyor. Various means may be used for this purpose but suitable ones (which are not shown in the drawings) are as follows. For the conveyor 10 which is only handling empty trays it is sufficient to have a hinged stop member which is swung across the path of the conveyor 10 when an empty tray is inserted to stop oncoming trays. The stop member is spring returned to swing free of the path as the inserted tray moves away. For the conveyor 10, skid bars are provided adjacent the conveyor, on which the carrier containing the dirty crockery is placed. The carrier is prevented from being slid onto the conveyor 10 by a gate, one of which is provided at each position. These gates are periodically raised and simultaneously a small arm makes contact with the back of the carrier and moves it along the skid bars onto the conveyor. In this way carriers are moved onto the conveyor at each position simultaneously, and collision is avoided.

In the above described arrangement the conveyors have all followed a straight path, but it is of course possible to employ conveyors having curved paths where this is desirable. A suitable conveyor for this purpose is described in co-pending application No. 12,454/50. Moreover, the delivery conveyor may be arranged to supply serving positions on both sides of the conveyor. One way in which this can be done is to provide deflecting arms on both sides of the track.

What I claim is:

1. In a transport mechanism for conveying ordered meals on carriers from a kitchen to any preselected one of a number of receiving stations, the combination of a low speed conveyor upon which the carriers are conveyed from said kitchen, a high speed conveyor on which the carriers are conveyed for the major part of their journey to a receiving station, accelerating means for transferring the goods from said slow speed conveyor to said high speed conveyor whilst accelerating them from substantially the speed of the former to that of the latter, a further low speed conveyor system extending from alongside said high speed conveyor to adjacent said receiving stations, and a number of deflector means, one corresponding to each receiving station, selectively operated in response to identification means on the carriers and which are characteristic of the particular receiving station for which a carrier is destined, operation of a deflector means serving to deflect an oncoming tray, while maintaining its movement, onto said further low speed conveyor system whereby it is delivered to the preselected receiving station.

2. A transport mechanism according to claim 1, in which said accelerating means comprises a conveyor which is periodically accelerated from approximately the speed of said low speed conveyor to that of said high speed conveyor, means being provided for admitting carriers to the accelerating conveyor only when it is travelling at a speed equal to that of said low speed conveyor.

3. A transport mechanism according to claim 1, in which means are provided for detecting the presence of carriers which have been conveyed past all said receiving stations without having been deflected thereinto.

4. In a transport mechanism for conveying ordered meals on carriers from a kitchen to any preselected one of a number of receiving stations, the combination of a low speed conveyor upon which the carriers are conveyed from said kitchen, a high speed conveyor on which the carriers are conveyed for the major part of their journey to a receiving station, accelerating means for transferring the goods from said low speed conveyor to said high speed conveyor whilst accelerating them from substantially the speed of the former to that of the latter, a further low speed conveyor system extending from alongside said high speed conveyor to adjacent said receiving stations, the length of said further low speed conveyor system being at least twice the length of a carrier, means at each receiving station for bringing smoothly to rest a carrier delivered to said means, and a number of deflector means, one corresponding to each receiving station, selectively operated in response to identification means on the carriers and which are characteristic of the particular receiving station for which a carrier is destined, operation of a deflector means serving to deflect an oncoming tray, while maintaining its movement, onto said further low speed conveyor system from which it is delivered to the means for bringing a carrier smoothly to rest when this means is unoccupied by any preceding carrier.

5. A transport mechanism according to claim 4, in which said accelerating means comprises a conveyor which is periodically accelerated from approximately the speed of said low speed conveyor to that of said high speed conveyor, means being provided for admitting carriers to the accelerating conveyor only when it is travelling at a speed equal to that of said low speed conveyor.

6. A transport mechanism according to claim 4, in which means are provided for detecting the presence of carriers which have been conveyed past all said receiving stations without having been deflected thereinto.

References Cited in the file of this patent

UNITED STATES PATENTS

| Number | Name | Date |
|---|---|---|
| 722,937 | Begg | Mar. 17, 1903 |
| 770,260 | Cahill | Sept. 20, 1904 |
| 1,143,829 | Jennings | June 22, 1915 |
| 1,574,914 | McNamara | Mar. 2, 1926 |
| 1,654,689 | Knap | Jan. 3, 1928 |
| 1,803,391 | Jennings | May 5, 1931 |
| 1,968,547 | Yost | July 31, 1934 |
| 2,516,985 | Hecht | Aug. 1, 1950 |